United States Patent [19]

Stinson

[11] Patent Number: 4,878,643

[45] Date of Patent: Nov. 7, 1989

[54] WIDE ANGLE MIRROR FOR BIRDHOUSES

[76] Inventor: Jim E. Stinson, 9508 Wesso Circle, Shreveport, La. 71118

[21] Appl. No.: 319,299

[22] Filed: Mar. 6, 1989

Related U.S. Application Data

[63] Continuation-in-part of Ser. No. 228,502, Aug. 5, 1988.

[51] Int. Cl.$^4$ .............................................. G08B 15/00
[52] U.S. Cl. ................................ 248/475.1; 248/302; 116/22 A
[58] Field of Search ..................... 248/466, 475.1, 476, 248/479, 489, 495, 497, 498, 214, 231.7, 231.8, 121, 122, 302, 309.1, 317, 323, 324, 359 F; 40/479; 116/22 A; 119/26; 52/101

[56] References Cited

U.S. PATENT DOCUMENTS

| | | | |
|---|---|---|---|
| D. 175,292 | 8/1955 | Austgen | 119/26 |
| 1,287,968 | 12/1918 | Greenleaf | 116/22 A |
| 1,409,779 | 3/1922 | Reavis | 248/497 |
| 2,071,243 | 2/1937 | Tripp | 350/638 |
| 2,584,782 | 2/1952 | Beckman | 119/26 |
| 2,722,195 | 11/1955 | Rockafeller | 116/22 A |
| 2,731,949 | 1/1956 | Arnould | 119/26 |
| 2,796,043 | 1/1957 | Albert | 119/26 |
| 3,041,911 | 7/1962 | Marder | 116/22 A |
| 3,085,545 | 4/1963 | Ore | 116/22 A |
| 3,436,882 | 4/1969 | Keefe | 52/101 |
| 3,730,612 | 5/1973 | Arroyo | 350/639 |
| 3,876,080 | 4/1975 | Hultberg | 248/323 |
| 4,131,079 | 12/1978 | Rousseau | 248/121 |
| 4,144,832 | 3/1979 | Dahl | 248/291 |
| 4,490,012 | 12/1984 | Magiske | 350/638 |
| 4,597,357 | 7/1986 | LeMessurier | 40/479 |
| 4,603,944 | 8/1986 | Greenlaw | 350/638 |

FOREIGN PATENT DOCUMENTS 476266 6/1936 United Kingdom .................. 52/101

Primary Examiner—Ramon O. Ramirez
Assistant Examiner—Robert A. Olson
Attorney, Agent, or Firm—John M. Harrison

[57] ABSTRACT

Wide angle mirrors for mounting on Purple Martin birdhouses, which mirrors are characterized in a first preferred embodiment by a circular mirror mounted in a square frame and polished on a single, wide angle convex surface. In a second preferred embodiment the mirror is characterized by a double convex wide angle surface. An L-rod extends to the mirror or mirror frame for pivotal or fixed mounting to the frame and the opposite end of the L-rod is shaped for attachment to a birdhouse by means of a bracket and a fastener. In a most preferred embodiment of the invention, the L-rod is directed downwardly on the extending end, which extending end is fashioned into a hook, from which the mirror frame hangs, such that the mirror will oscillate in the wind. At the opposite, or mounted end, the U-shaped L-rod end is secured to a ledge of the birdhouse by the bracket and a nail, screw or both. Both the single convex mirror and the double-convex mirrors are polished and the frames may be provided with a hook opening at the midpoint of one of the four edges of the mirror frame. Each mirror frame can therefore be rotatably or fixedly attached to the L-rod, as desired. In an alternative embodiment of the invention, the mirror may extend upwardly through the frame and contain a hole near the rim or edge, respectively, and the L-rod is extended through the hole to support both the mirror and frame. In each case, the convex mirror or mirrors are suspended outwardly of the birdhouse to facilitate optimum image-reflecting surfaces, considering the single and double convex mirror design.

8 Claims, 1 Drawing Sheet

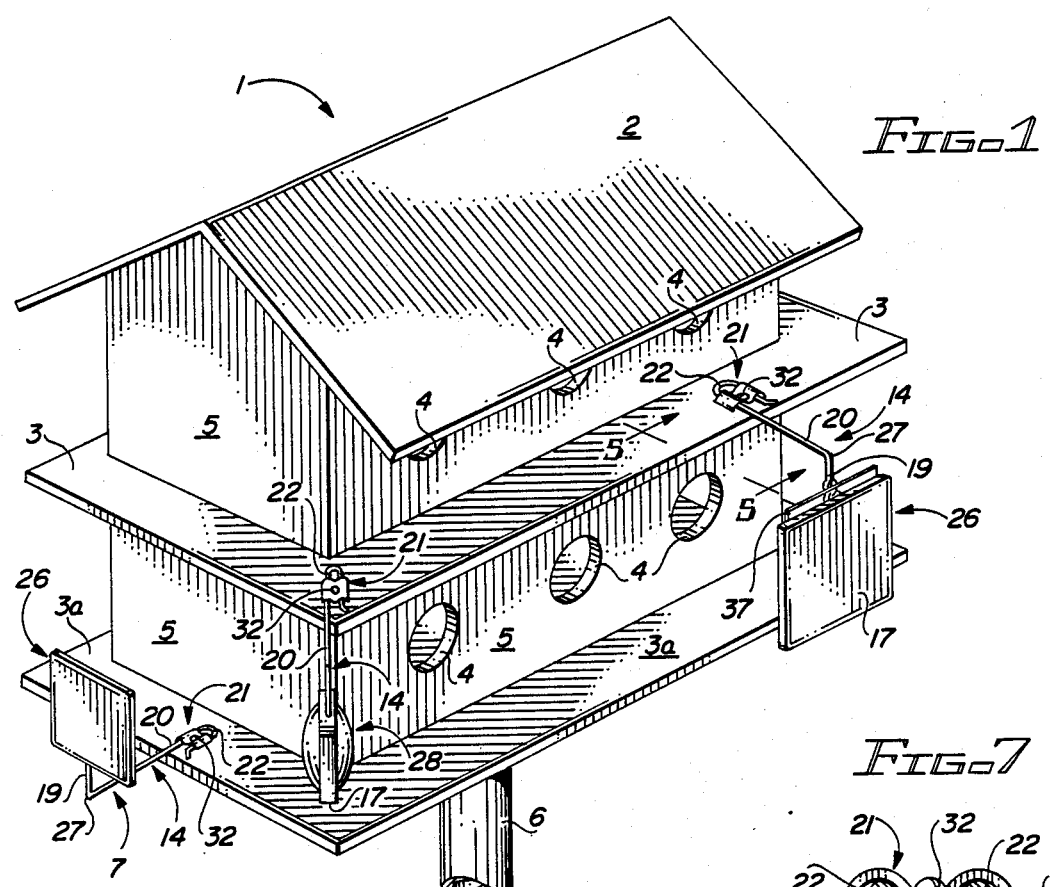
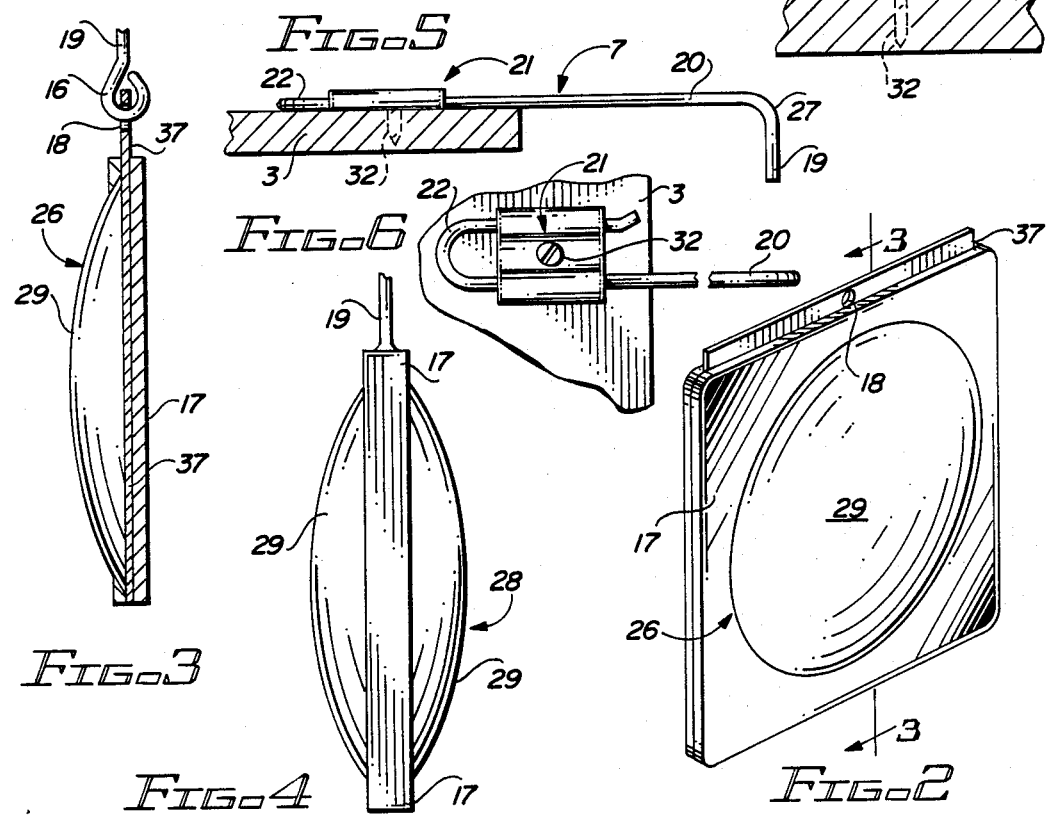

WIDE ANGLE MIRROR FOR BIRDHOUSES

CROSS REFERENCE TO RELATED APPLICATION

This application is a Continuation-In-Part of my co-pending U.S. Pat. Application Ser. No. 07/228,502, filed Aug. 5, 1988.

BACKGROUND OF THE INVENTION

FIELD OF THE INVENTION

Populations of Purple Martins in birdhouses have long been reduced by the occupancy of Starlings and House Sparrows, and Starlings are known to destroy nests, eggs and young birds, as well as adult birds of all species. This invention relates to means for preventing the undesirable Starlings, and to some extent House Sparrows, from occupying and nesting in Purple Martin birdhouses. Specifically, the invention relates to the use of single and double convex mirrors for reflecting the images of birds attracted to the birdhouse. The convex mirrors of this invention are positioned with the curved, wide angle image-reflecting surface or surfaces facing the birdhouse and the object is to scare the Starlings and House Sparrows and these and other birds, to prevent them from entering and nesting in the birdhouse, since, unlike Purple Martins, Starlings and some House Sparrows flee at the sight of their reflection in the mirror. More particularly, the invention relates, in a preferred embodiment, to circular single and double convex mirrors mounted in mirror frames which are rotatably or fixedly attached to one end of a perch, and preferably, an elongated L-rod. The opposite end of the L-rod is U-shaped and adapted for attachment to the birdhouse by means of a "double-S" bracket. In a most preferred embodiment of the invention, the L-rod is adapted for attachment to the horizontal birdhouse ledge by means of the bracket using a nail, screw or bolt. In a primary embodiment of the invention, the convex image-reflecting surfaces of the mirrors are designed to enlarge and-/or distort the birds image and the supporting frames, or the mirrors themselves, may be provided with a hole, through which the L-rod is inserted to support the mirror.

DESCRIPTION OF THE PRIOR ART

Various types of inventions for influencing the behavior of birds are known in the art. Typical of these inventions is the "Bird Operated Music Box", disclosed in U.S. Pat. No. 3,041,911 dated July 3, 1962, to Michael Marder. This patent details a music box which can be operated by a perching bird and includes a mirror that allows a bird perched in front of the mirror to compete with its reflection by singing or whistling. The apparatus includes a hexagon-shaped box with a sloping roof, a music-making device that is contained inside the box and a perch which is connected to the device. The mirror is mounted on the outside of the box in front of the perch. U.S. Pat. No. 4,597,357, dated July 1, 1986, to David H. LeMessurier, details a set of "Bird Frightening Devices" designed to prevent birds from attacking and eating vulnerable plants and fruits. The invention includes an aluminum sheet with small impressions throughout to increase light reflection. The sheet is supported by a swivel and features a twist and angled edges to enable movement due to air motion, while hanging freely from tree or plant limbs. Disclosed in U.S. Pat. No. 4,144,832 dated Mar. 20, 1979, to Forrest K. Dahl, is a "Bird Spook". The device is characterized by a thin, disc-like plate having at least one light-reflecting surface and is suspended from a supporting arm by a swivel. The supporting arm may be attached to the surface of a building by an adjustable support bracket, which enables the arm to assume multiple angles with respect to the surface of the building and insure freedom of movement of the reflecting plate. Alternatively, the supporting arm is vertically adjustable for varying the height of the reflecting plate above the ground in crop-protecting installations. Air movements oscillate the plate, producing random light reflections for annoying and frightening birds and pests. A "Wind Rotated Reflective Scarecrow" is detailed in U.S. Pat. No. 4,131,079 dated Dec. 26, 1978, to John F. Rousseau, Jr., et al. The device is designed for scaring pests such as birds from a desired area and consists of a resilient wire mounted on and extending from the upper end of an elongated, vertical post. A pair of large, thin, lightweight and highly light-reflective discs are rotatably suspended from the remote end of the wire in cantilever fashion. These discs respond to wind forces to provide a random, distracting motion and cast darting light reflections on the area surrounding the post. U.S. Pat. No. 3,436,882 dated Apr. 8, 1969, to John M. Keefe details a "Pigeon Chaser", which is characterized by a plurality of movable elements rotatably mounted in spaced relationship on a flexible, horizontal wire, opposite ends of which are secured to supports. Each movable element has a flat body which reflects light and an U-shaped head section having a pair of spaced flanges with aligned holes for accommodating the wire, whereby the body will swing and rotate in response to moving air and movement of the wire, to produce a crackling and ringing noise. Freely rotating, tubular plastic spacers mounted between adjacent elements maintain spaces between the elements to prevent a bird from perching on the device. U.S. Pat. No. 3,085,545, dated Apr. 16, 1963, to E. G. Ore, details a "Scarecrow" which is characterized by a flat plate shaped in the configuration of a cathead and provided with curved eyes extended from the plane of the head. U.S. Pat. No. 2,584,782, dated Feb. 5, 1952, to A. H. Beckman, further details a "Guard or Protector for Poultry Service Utensils". The guard includes a sphere mounted on one end of a curved support by means of a straight rod having an eye in the extending end thereof. Alternatively, the sphere can be mounted on a flexible spring for movement in the wind or when the poultry service utensil is struck, in order to prevent birds from feeding in the poultry service utensil. A "Device for Frightening Birds and Animals" is detailed in U.S. Pat. No. 2,722,195, dated Nov. 1, 1955, to A. J. Rockafeller. The patent includes a reflective device having outwardly-extended vanes rotatably mounted on a support in order to catch the wind, reflect light and scare birds and animals from a feeding location. U.S. Pat. No. 1,287,968, dated Dec. 17, 1918, to P. I. Greenleaf, details a "Reflector" for blinding and frightening chicken hawks or similar birds and preventing their approach to domestic fowls. The reflector is characterized by multiple triangular-shaped panels which are joined along one axis and pivotally attached to a chain or other suspension means to catch the light as the wind rotates the panels. A "Mirror Support" is detailed in U.S. Pat. No. 1,409,779, dated Mar. 14, 1922, to J. 0. Reavis. The mirror support is characterized by an elongated wire having a hook at one end for clipping over a light cord and locating a mirror at the opposite end beneath the light cord to facilitate viewing an image in the mirror beneath the light. U.S. Pat. No. 2,071,243, dated Feb. 16, 1937, to J. S. Tripp, details a "Reflector" which includes a mirror mounted on a stiff wire member having a curved frame therein, which curved frame is designed to fit around the neck of a user, in order to support the mirror in front of the user's face without using the hands. German Pat. No. 476,266, dated June 30, 1936, details a "Means for Scaring Birds" which includes a reflective mirror mounted directly to a ring, or to the ring by means of an associated clip, for frightening birds. U.S. Pat. No. 3,876,080, dated Apr. 8, 1975, to A. A. Hultburg, et al details a "Suspension of Articles". The patent outlines a method and means for suspending articles at an arbitrarily chosen level below a selected suspension point by using at least partly helically-wound metal wire. In carrying out the method, the turns of the metal wire are straightened by manually pulling in the longitudinal direction of the wire until the length of wire desired for each article has been reached, the wire being so dimensioned with respect to diameter and the diameter of the turns, that it can contain its altered shape even when extended to at least ten times it original length when stored spirally.

One of the problems which is inherit in existing devices for bird exclusion from birdhouses is failure to maintain exclusion of certain types of birds, while at the same time facilitating access by and nesting of other bird species. The purpose of existing prior art devices is to maintain non-discriminatory exclusion of all types of birds via distracting and light-reflecting members, without the selection and encouragement of certain types of birds to perch and nest. It has surprisingly been found that positioning convex, wide-angle mirrors near birdhouses frightens the undesirable Starlings and House Sparrows, as well as certain other birds, but has little or no effect on Purple Martins.

Accordingly, an object of this invention is to provide a wide-angle mirror for mounting on a birdhouse for the purpose of frightening Starling birds and other bird species and encouraging the nesting of Purple Martin birds, which mirror contains at least one convex image-reflecting surface.

It is another object of this invention to provide a mirror assembly designed to prevent, or at least retard, the entry of Starling birds and some House Sparrows into Purple Martin birdhouses, which mirror assembly is characterized by a perch or rod adapted for attachment to a birdhouse at one end, and at the other end having a wide-angle, single or double convex mirror fixedly or rotatably attached to the perch, in order to secure the convex mirror in a desired position for viewing by the birds.

Another object of this invention is to provide a single or double convex mirror having a selected image-reflecting surface curvature, to retard Starlings from entering and nesting in Purple Martin birdhouses, which convex mirror is mounted in a frame and is characterized by a rod having a bracket adapted for attachment to the ledge of a birdhouse at one end and having a downwardly-extending end for suspending the frame in fixed or oscillating relationship.

Still another object of the invention is to provide one or more single or double convex, image-enlarging and-/or image-distorting mirrors mounted in mirror frames, and an L-rod mount for mounting the mirrors to the birdhouse and retarding Starlings from nesting in the birdhouse, which mirror frames are color-coded to match the color of the birdhouse.

SUMMARY OF THE INVENTION

These and other objects of the invention are provided in one or more single or double convex mirrors for mounting on elongated perch rods on a birdhouse and scaring Starlings by their own reflection in the convex mirrors in order to exclude them from birdhouse, while simultaneously allowing Purple Martins to enter and nest in the birdhouse. In a first preferred embodiment of the invention, each convex mirror assembly is characterized by a support rod adapted for attachment to a birdhouse ledge at one end and the other end having an L-bend for receiving a mirror frame which mounts a single or double convex mirror. Each mirror may be attached to the perch rod by means of a swivel member or hook, or it may be fixed to the perch rod, as desired, and includes one or two convex, image-distorting, equal size-reflecting or size-enhancing reflecting surfaces, depending upon choice of curvature. The hook mount allows each mirror to oscillate responsive to air motion. In a most preferred embodiment, an L-rod which has one U-shaped mount end adapted for horizontal attachment to a birdhouse and the opposite support end extending 90 degrees downwardly in a vertical position, is used to suspend the single or double convex mirror from a hook fashioned in or attached to the downwardly-extending end.

BRIEF DESCRIPTION OF THE DRAWING

The invention will be better understood by reference to the accompanying drawing, wherein:

FIG. 1 perspective view of a Purple Martin birdhouse which receives and mounts preferred embodiments of the mirror assemblies and mirrors of this invention;

FIG. 2 is a perspective view of a single convex mirror and frame component illustrated in FIG. 1;

FIG. 3 is a sectional view of the single convex mirror and frame taken along line 3—3 FIG. 2;

FIG. 4 a side view of a double convex mirror and mirror frame component illustrated in FIG. 1;

FIG. 5 is a side view of a preferred L-shaped, mirror-supporting perch rod mounted to the birdhouse by means of a bracket, as illustrated in FIG. 1;

FIG. 6 is a top view, partially in section, of the support end of the perch rod and bracket illustrated in FIGS. 1 and 5; and FIG. 7 is a sectional view of the support end of the perch rod and bracket illustrated in FIGS. 1, 5 and 6.

DESCRIPTION OF THE PREFERRED EMBODIMENTS

Referring initially to FIG. 1 of the drawing, two variations of the wide angle mirror for birdhouses of this invention are generally illustrated mounted to a birdhouse 1 having a slanting roof 2, a top ledge 3, bottom ledge 3a and birdhouse walls 5, provided withsspaced access holes 4 for receiving Purple Martin birds. The interior (not illustrated) of the birdhouse 1 is subdivided into individual compartments accessed by the access holes 4, respectively, to accommodate several birds during the hatching process. The birdhouse 1 is supported vertically by a pole 6 and the wide angle mirrors are characterized by single convex mirrors 26 and double convex mirrors 28, respectively. The single convex mirrors 26 and the double convex mirrors 28 are each suspended outwardly from the top ledge 3 and the bottom ledge 3a, respectively, of the birdhouse 1 by means of an L-shaped perch rod 14, characterized by an elongated mount leg 20, provided with a perch rod bend 27 in the extending end thereof, to define a mirror leg 19. Each of the mount legs 20 of the respective L-shaped perch rods 14 are further shaped at the mount end to define a mount leg loop 22, in order to receive a "double-S" bracket 21, which is secured to the wooden top ledge 3 and bottom ledge 3a, by means of a screw 32, as hereinafter further described.

Referring now to FIGS. 1-3, in a most preferred embodiment of the invention each of the single convex mirrors 26 are further characterized by a convex mirror curvature 29, extending from the plane of a mirror frame 17 which receives and securely mounts the single convex mirror 26. In a most preferred embodiment of the invention, the mirror frame 17 is square in configuration and is color-coded to match the color of the birdhouse 1, for esthetic purposes. However, it will be appreciated that the mirror frame 17 may be shaped in other configurations, as desired. Furthermore, in another most preferred embodiment of the invention, the single convex mirror 26 is mounted to a thin lens frame 37, which is sandwiched inside the mirror frame 17 and extends from the top edge of the mirror frame 17 for suspension purposes. Furthermore, a mount hole 18 is provided in the lens frame 37, in order to receive an eye hook 16, as illustrated in FIG. 3, shaped in the downwardly-extending end of the mirror leg 19 of the mount leg 20. Alternatively, the mirror frame 17 itself can be provided with an opening (not illustrated) for receiving the eye hook 16 of the mirror leg 19. Accordingly, it will be appreciated that the single convex mirror 26 and the mirror frame 17 may thusly oscillate with respect to the fixed eye hook 16, in order to facilitate covering an even wider expanse of the ledge 3 when the single convex mirror 26 is mounted to the upper ledge 3 on the right-hand side of the birdhouse 1, as illustrated in FIG. 1. The single convex mirror 26 is therefore positioned to cover a large area of both the top ledge 3 and the bottom ledge 3a by virtue of the oscillating and swinging function of the single convex mirror 26 with respect to the eye hook 16, as well as the convex mirror curvature 29 in the single convex mirror 26.

Referring now to FIGS. 1 and 4 of the drawing, in another preferred embodiment of the invention a double convex mirror 28 is suspended from the end of an L-shaped perch rod 14, the opposite end of which perch rod 14 is also secured to the top ledge 3 by means of a bracket 21 and a screw 32, as hereinafter further detailed. The double convex mirror 28 is characterized by a convex mirror curvature 29 of selected detail on both sides thereof projecting outwardly of the plane of the center of the mirror frame 17, as illustrated. The downwardly-extending mirror leg 19 of the L-shaped perch rod 14 is fixedly attached to the top edge of the mirror frame 17, in order to secure the double convex mirror 28 in position outwardly of one corner of the top ledge 3 and the bottom ledge 3a of the birdhouse 1. Accordingly, the positioning of the two convex mirror curvatures 29 with respect to the corner of the birdhouse 1 is such that birds landing on either the top ledge 3 or the bottom ledge 3ato the left or right of the corner as viewed in FIG. 1, will see their reflection therein. Alternatively, it is understood that the double convex mirror 28 can also be mounted to the downwardly-extending mirror leg 19 using an eye hook 16, as illustrated in FIG. 3 with respect to the mounting of the single convex mirror 26, if an oscillating action is desired in the double convex mirror 28.

Referring again to FIG. 1 of the drawing and to the extreme left-hand side of the birdhouse 1, a single convex mirror 26 is mounted in upward-standing relationship to an upward-standing mirror leg 19 of a corresponding L-shaped perch rod 14 which is secured to the bottom ledge 3a of the birdhouse 1, using another bracket 21 and a screw 32. It will be appreciated that the single convex mirror 26 is identical to the single convex mirror 26 illustrated in FIG. 3, except that the mirror frame 17 is fixedly attached to the upward-standing mirror leg 19, in order to fix the single convex mirror 26 in the position illustrated in FIG. 1 and cover the entire segment of the bottom ledge 3a which spans the left-hand side of the birdhouse 1.

Referring now to FIGS. 1 and 5-7, in a most preferred embodiment of the invention, each of the single convex mirrors 26 and the double convex mirrors 28 are attached to either the top ledge 3 or the bottom ledge 3a of the birdhouse 1 by means of an L-shaped perch rod 14, characterized by an elongated mount leg 20, having a mirror leg 19 extending in 90-degree relationship with respect thereto at a perch rod bend 27. A "double-S" bracket 21 spans the two legs of the mount leg loop 22 shaped in each mount end of the mount legs 20 and is secured in position using a fastener, such as a screw 32, depending upon the material of construction of the birdhouse 1, in order to project the corresponding mirror leg 19 downwardly or upwardly, as desired, and mount the single convex mirror 26 and the double convex mirror 28 in the desired location. The extending ends of the mirror legs 19 may be provided with an eye hook 16, as heretofore described, in order to secure either a single convex mirror 26 or a double convex mirror 28 thereto for mirror oscillation in the wind, or the mirror leg 19 can be fixedly attached to the respective mirror frame 17, further as heretofore described.

It will be appreciated by those skilled in the art that the wide angle mirror for birdhouses of this invention is characterized by great flexibility and utility, in that various convex mirrors of selected single or double convex design may be mounted either pivotally or in fixed relationship outwardly-extended from a birdhouse to cover the entire expanse of the birdhouse and prevent Starlings and other birds which are frightened by viewing their image in the mirror, from the birdhouse. The convex lens or lenses of the mirrors in both single and double configuration may vary as to curvature to optionally reflect actual size, larger size and distorted images and this feature, combined with the oscillating function of eye hook-mounted mirrors, serves to greatly increase the effectiveness, as well as the expanse and area, of birdhouse protection.

Accordingly, while the preferred embodiments of this invention have been described above, it will be recognized and understood that various modifications may be made therein and the appended claims are intended to cover all such modifications which may fall within the spirit and scope of the invention.

Having described my invention with the particularity set forth above, what is claimed is:

1. A wide angle mirror for reducing the incidence of undesirable, image-sensitive birds nesting in a birdhouse, comprising at least one convex mirror, frame means supporting said convex mirror, an elongated roof having a U-shaped mount leg loop provided in one end, a double-S-shaped bracket adapted to engage said U-shaped mount leg loop provided in said one end of said elongated rod and secure said one end of said elongated rod to the birdhouse, with the opposite end of said elongated rod attached to said frame means, said convex mirror having at least one convex image-reflecting surface of selected curvature, whereby when the image-sensitive birds view reflected images of themselves in said convex image-reflecting surface, the image-sensitive birds are frightened from the birdhouse.

2. The mirror of claim 1 wherein said elongated rod further comprises a generally L-shaped bend provided in said opposite end, whereby said opposite end of said rod extends downwardly from said bend and receives said mirror frame in fixed realtionship.

3. The mirror of claim 2 further comprising first attachment means provided in said mirror frame and second attachment means provided on said opposite end of said rod, said first attachment means engaging said second attachment means for suspending said mirror frame and said mirror from said opposite end of said rod in oscillating relationship.

4. The mirror of claim 3 wherein said at least one convex image-relecting surface further comprises two oppositely-disposed convex image-reflecting surfaces located on opposite sides of said mirror.

5. A wide angle mirror assembly for mounting on a birdhouse and retarding the nesting of Starling birds in the birdhouse, said mirror assembly comprising a rod having a U-shaped bend in one end, said one end adapted for mounting on the birdhouse, a frame carried by the opposite end of said rod, a clamp having a double-S-bend configuration, said clamp adapted for attachment to said U-shaped bend in said one end of said elongated rod for removably securing said elongated rod to the birdhouse and a mirror mounted in said frame, said mirror having at least one convex image-reflecting surface for reflecting the image of the Starling birds and frightening the Starling birds from the birdhouse.

6. The mirror assembly of claim 5 wherein said elongated rod further includes a generally L-shaped bend provided in said opposite end, whereby said opposite end of said rod extends downwardly from said bend and receives said frame.

7. The mirror assembly of claim 6 further comprising an opening provided in said frame and a hook provided on said opposite end of said rod, with said hook pivotally engaging said opening for suspending said frame and said mirror from said opposite end of said rod in oscillating relationship.

8. The mirror assembly of claim 7 wherein said at least one convex image-reflecting surface further comprises two image-reflecting surfaces located on opposite sides of said mirror.

* * * * *